(12) United States Patent
Hulse et al.

(10) Patent No.: US 9,994,751 B2
(45) Date of Patent: Jun. 12, 2018

(54) ABSORPTION REFRIGERATION CYCLES USING A LGWP REFRIGERANT

(75) Inventors: Ryan J. Hulse, Getzville, NY (US); Rajiv Ratna Singh, Getzville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 614 days.

(21) Appl. No.: 12/432,466

(22) Filed: Apr. 29, 2009

(65) Prior Publication Data

US 2009/0272134 A1 Nov. 5, 2009

Related U.S. Application Data

(60) Provisional application No. 61/049,069, filed on Apr. 30, 2008.

(51) Int. Cl.
*F25B 15/02* (2006.01)
*C09K 5/04* (2006.01)
*F25B 15/00* (2006.01)

(52) U.S. Cl.
CPC ............ *C09K 5/047* (2013.01); *F25B 15/008* (2013.01); *F25B 15/02* (2013.01); *Y02B 30/62* (2013.01); *Y02P 20/124* (2015.11)

(58) Field of Classification Search
CPC .......... F25B 15/16; F25B 37/00; F25B 15/12; F25B 15/10; F25B 17/08; F25B 17/083; F25B 17/086
USPC .................................. 62/102, 512, 484, 483
See application file for complete search history.

(56) References Cited

U.S. PATENT DOCUMENTS

| | | | | |
|---|---|---|---|---|
| 1,798,946 A | * | 3/1931 | Guido et al. | 62/101 |
| 1,830,863 A | * | 11/1931 | Watts | 62/494 |
| 1,901,794 A | * | 3/1933 | Altenkirch | 62/101 |
| 2,290,532 A | * | 7/1942 | Buffington | 62/109 |
| 3,046,756 A | * | 7/1962 | Whitlow et al. | 62/141 |
| 3,273,350 A | * | 9/1966 | Taylor | 62/101 |
| 3,473,347 A | * | 10/1969 | Andrews et al. | 62/476 |
| 4,285,211 A | * | 8/1981 | Clark | 62/335 |
| 4,601,738 A | * | 7/1986 | Mehra | 62/635 |
| 5,237,839 A | * | 8/1993 | Dehne | 62/476 |
| 5,366,646 A | * | 11/1994 | Sato et al. | 508/262 |
| 5,381,673 A | * | 1/1995 | Lee et al. | 62/483 |
| 7,534,366 B2 | * | 5/2009 | Singh | C07C 19/08 252/68 |
| 8,946,312 B2 | * | 2/2015 | Basu | C08J 9/127 252/67 |

(Continued)

FOREIGN PATENT DOCUMENTS

JP 05-280822 A 10/1993

OTHER PUBLICATIONS

H. Renon and J.M. Prausnitz, "Local Compositions in Thermodynamic Excess Functions for Liquid Mixtures," AlChe J. vol. 14, No. 1, pp. 135-144 (1968) US.

(Continued)

*Primary Examiner* — Ljiljana Ciric
*Assistant Examiner* — Alexis Cox
(74) *Attorney, Agent, or Firm* — Colleen D. Szuch

(57) ABSTRACT

An absorptive refrigeration method that employs a refrigerant comprising one or more hydrofluoroolefin or hydrochlorofluoroolefin refrigerants, and an oil selected from the group consisting of a polyalkyene glycol oil, a poly alpha olefin oil, a mineral oil and a polyolester oil.

12 Claims, 3 Drawing Sheets

(56) References Cited

U.S. PATENT DOCUMENTS

| | | | | |
|---|---|---|---|---|
| 8,951,431 B2* | 2/2015 | Hulse | .................. | C07C 17/38 |
| | | | | 252/182.15 |
| 8,999,909 B2* | 4/2015 | Merkel | .................. | C07C 19/01 |
| | | | | 510/408 |
| 9,126,888 B2* | 9/2015 | Hulse | .................. | C07C 21/18 |
| 2005/0241805 A1* | 11/2005 | Singh et al. | .................. | 165/104.12 |
| 2006/0191288 A1 | 8/2006 | Tobias | | |
| 2008/0016902 A1 | 1/2008 | Artsiely | | |
| 2015/0018429 A1* | 1/2015 | Hulse | .................. | A62D 1/0057 |
| | | | | 514/744 |
| 2016/0178254 A1* | 6/2016 | Nishiguchi | .................. | C09K 5/044 |
| | | | | 62/115 |

OTHER PUBLICATIONS

R.H. Perry and D.W. Green, "Perry's Chemical Engineer's Handbook," Ed. McGraw Hill, 8th Ed., pp. 11-90-11-93 (2008) US .

* cited by examiner

ABSORPTION REFRIGERATION CYCLES USING A LGWP REFRIGERANT

BACKGROUND OF THE INVENTION

Field of Invention

This invention relates to economical absorption refrigeration systems that employ refrigerants with low global warming potential (GWP) and low ozone depletion potential (ODP).

Description of Prior Art

Absorption refrigeration is a more economical alternative to compression refrigeration when a source of waste or other low-cost heat (e.g. solar heating) is available. Both absorption refrigerators and vapor compression refrigerators use a refrigerant with a very low boiling point. In both types, when this refrigerant evaporates or boils, it takes some heat away with it, providing the cooling effect. However, absorption refrigeration and vapor compression refrigeration differ in the way the refrigerant is changed from a gas back into a liquid so that the cycle can repeat. A vapor compression refrigerator uses an electrically-powered compressor to increase the pressure on the gas, and then condenses the hot high pressure gas back to a liquid by heat exchange with a coolant (usually air). An absorption refrigerator changes the gas back into a liquid using a different method that needs only a low-power pump, or optionally only heat thereby eliminating the need for moving parts.

Common examples of refrigeration cycles are food refrigerators and freezers and air conditioners. The reversible-cycle heat pumps for providing thermal comfort also work by exploiting the physical properties of evaporating and condensing a refrigerant. In heating, ventilation, and cooling (HVAC) applications, a heat pump normally refers to a refrigeration device that includes a reversing valve and optimized heat exchangers so that the direction of heat flow may be reversed. Most commonly, during the heating cycle, heat pumps draw heat from the air or from the ground, or even from water.

Conventionally, absorption refrigeration systems use ammonia/water and lithium bromide/water as working fluids. Due to the toxicity and flammability of ammonia and the corrosive nature of lithium bromide, such systems are typically only used in industrial settings. Another problem with such conventional systems is that the evaporator and the absorber are typically operated below atmospheric pressure which increases the cost of such systems because the equipment must be specially designed to work safely at low pressures.

Accordingly, there remains a need for safer and environmentally friendly refrigerant for absorption-type refrigeration systems.

SUMMARY OF THE INVENTION

Certain hydrofluoroolefin and/or hydrochlorofluoroolefin, particularly those suitable for use as refrigerants, are at least partially soluble in an oil such as polyalkyene glycol oil, poly alpha olefin oil, mineral oil, and polyol ester oil. It has been discovered that solutions of these refrigerants and oils enable the refrigerant to be used as a working fluid in an absorption-type refrigeration system. Many of these refrigerants are characterized as having a low-GWP (i.e., <1000, and preferably <100 relative to $CO_2$), a low or no appreciable ozone depletion potential, and are non-toxic and non-flammable.

Accordingly, an aspect of this invention involves a method for providing refrigeration comprising: (a) evaporating a first liquid-phase refrigerant stream comprising a refrigerant selected from the group consisting of one or more hydrofluoroolefins, one or more hydrochlorofluoroolefins, and blends thereof, to produce a low-pressure vapor-phase refrigerant stream, wherein said evaporating transfers heat from a system to be cooled; (b) contacting said low-pressure vapor-phase refrigerant stream with a first liquid-phase solvent stream comprising a solvent selected from the group consisting of a polyalkyene glycol oil, a poly alpha olefin oil, a mineral oil, a polyolester oil, and combinations thereof under conditions effective to dissolve substantially all of the refrigerant of the vapor-phase refrigerant stream into the solvent of the first liquid-phase solvent stream to produce a refrigerant-solvent solution stream; (c) increasing the pressure and temperature of the refrigerant-solvent solution stream; (d) thermodynamically separating said refrigerant-solvent solution stream into a high-pressure vapor-phase refrigerant stream and a second liquid-phase solvent stream; (e) recycling said second liquid-phase solvent stream to step (b) to produce said first liquid-phase solvent stream; (f) condensing said high-pressure vapor-phase refrigerant stream to produce a second liquid phase refrigerant stream; and (g) recycling said second liquid-phase refrigerant stream to step (a) to produce said first liquid-phase refrigerant stream.

As used herein, the terms "low-pressure vapor-phase refrigerant" and "high-pressure vapor-phase refrigerant" are relative to one another. That is, a low-pressure vapor-phase refrigerant has a pressure above 0 psia, but lower than the pressure of the high-pressure vapor-phase refrigerant. Likewise, the high-pressure vapor-phase refrigerant has a pressure below the composition's critical point, but higher than the pressure of the low-pressure vapor-phase refrigerant.

As used herein, the term "substantially all" with respect to a composition means at least about 90 weight percent based upon the total weight of the composition.

In another aspect, the invention provides an absorption refrigeration system comprising: (a) a refrigerant selected from the group consisting of one or more hydrofluoroolefins, one or more hydrochlorofluoroolefins, and blends thereof; (b) a solvent selected from the group consisting of a polyalkyene glycol oil, a poly alpha olefin oil, a mineral oil, a polyolester oil, and combinations thereof; (c) an evaporator suitable for evaporating said refrigerant; (d) a mixer suitable for mixing said refrigerant with said solvent, wherein said mixer is fluidly connected to said evaporator; (e) an absorber suitable for dissolving at least a portion of said refrigerant into said solvent to produce a solution, wherein said absorber is fluidly connect to said mixer; (f) a pump fluidly connected to said absorber; (g) a heat exchanger fluidly connected to said pump; (h) a separator suitable for thermodynamically separating said solution into a vapor refrigerant component and a liquid solvent component, wherein said separator is fluidly connected to said heat exchanger; (i) an oil return line fluidly connected to said separator and said mixer, and (j) a condenser suitable for condensing said vapor refrigerant component, wherein said condenser is fluidly connected to said separator and said evaporator.

In certain embodiments of the invention, the absorption process is characterized as a double or triple effect. Accordingly, in another aspect of the invention provided is an absorption refrigeration system comprising: (a) a refrigerant selected from the group consisting of one or more hydrofluoroolefins, one or more hydrochlorofluoroolefins, and blends thereof; (b) a solvent selected from the group consisting of a polyalkyene glycol oil, a poly alpha olefin oil, a mineral oil, a polyester oil, and combinations thereof; (c) an evaporator suitable for evaporating said refrigerant; (d) a condenser suitable for condensing said refrigerant; (e) a separator suitable for thermodynamically separating a solution comprising said refrigerant dissolved in said solvent into a vapor refrigerant component and a liquid solvent component; and (f) at least one gas-dissolving subsystem comprising a mixer suitable for mixing said refrigerant with said solvent, an absorber suitable for dissolving at least a portion of said refrigerant into said solvent to produce a solution, a pump, and a heat exchanger, wherein said mixer is fluidly connected to said absorber, said absorber is fluidly connected to said pump, and said pump is fluidly connected to said heat exchanger; wherein said gas-dissolving subsystem is in fluid communication with said at least two units selected from the group consisting of said evaporator, said separator, and another gas-dissolving subsystem, provided that at least one subsystem is in fluid communication with said evaporator and at least one subsystem is in fluid communication with said separator.

This invention is an environmentally friendly, economical refrigeration process.

DETAILED DESCRIPTION OF THE PREFERRED EMBODIMENTS

Figure 1:
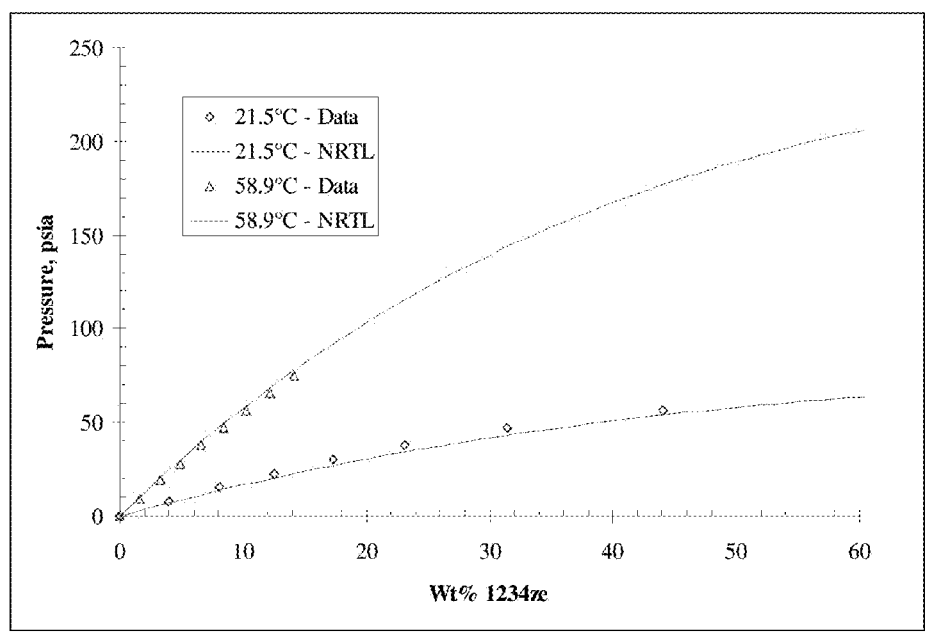
FIG. 1 is a graphically representation of data showing the solubility of HFO-1234ze(E) in a PAG lubricant.

In preferred embodiments of the invention, a hydrofluoroolefin and/or hydrochlorofluoroolefin refrigerant is used in an absorption-type refrigeration system as a working fluid, i.e., a fluid that changes states from gas to liquid or vice versa via a thermodynamic cycle. This phase change is facilitated by dissolving the vapor-phase refrigerant in an oil solvent to form a solution. Preferably, a pump and heat exchanger are used to efficiently increase the solution's pressure and temperature, respectively. The pressurized and heated solution is then flashed to produce a refrigerant vapor at high pressure. This high pressure vapor is then passed through a condenser and evaporator to transfer heat from a system to be cooled.

Preferred refrigerants for this invention include hydrofluoroolefins and hydrochlorofluoroolefins of the formula $C_wH_xF_yCl_z$ where w is an integer from 3 to 5, x is an integer from 1 to 3, and z is an integer from 0 to 1, and where y=(2·w)−x−z. Particularly preferred refrigerants include hydrohalopropenes, more preferably tetrahalopropenes, even more preferably tetrafluoropropenes and mono-chlorotrifluoropropenes, even more preferably tetrahalopropenes having a —$CF_3$ moiety, and most preferably 1,1,1,2-tetrafluoropropene, 1,3,3,3-tetrafluoropropene, 1-chloro-3,3,3-trifluoropropene, including all stereoisomers thereof, such as trans-1,3,3,3-tetrafluoropropene, cis-1,3,3,3-tetrafluoropropene, trans-1-chloro-3,3,3-trifluoropropene, cis-1-chloro-3,3,3-trifluoropropene and 3,3,3-trifluoropropene. Certain useful refrigerants also comprise a mixture of two or more hydrofluoroolefins, hydrochlorofluoroolefins, as well as mixtures of both hydrofluoroolefins and hydrochlorofluoroolefins.

Solvents useful in the present invention preferably are selected from the group consisting of polyalkyene glycol oil, a poly alpha olefin oil, a mineral oil and a polyolester oil. The oils selected are generally thermally stable, have very low vapor pressures, and are non-toxic and non-corrosive. Preferred oils that fit these criteria and can be used with various olefins above are poly-ethylene glycol oils, polyol ester oils, polypropylene glycol dimethyl ether-based and mineral oil.

Preferably, the refrigerant and solvent are mixed in proportions and under conditions effective to form a solution in which the refrigerant is dissolved in the solvent. Preferably the mixture of refrigerant and solvent is in proportions in which a substantial portion, and more preferably substantially all, of the refrigerant mixed with the solvent is dissolved in the solvent. That is, it is preferred that the amount of refrigerant to be mixed with the solvent is below the saturation point of the solvent at the operating temperature and pressure of the refrigerant system. Maintaining the refrigerant concentration below the saturation point decreases the likelihood that vapor refrigerant will reach the pump, where it could lead to cavitations.

Preferably, the refrigerant and solvent are mixed by a mixer. Preferred mixers include static mixers and aspirators (i.e., venturi pump). In certain embodiments, the mixer is a simple junction of two transfer lines (e.g., pipes, tubes, hoses, and the like) that produces a turbulent flow, such as a T-fitting.

Dissolution of the low-pressure vapor phase refrigerant in the oil solvent preferably occurs at refrigerant temperature of about −10° C. to about 30° C., more preferably about 0° C. to about 10° C.

Preferably, the dissolution of the refrigerant in the solvent occurs, at least to a major portion, in an absorber. The absorber can be of any type that is suitable for dissolving a refrigerant gas into an oil-based solvent. Examples of absorbers include heat exchangers through or around which a cooling medium is circulated.

The solution comprising the refrigerant and solvent is pumped against a means of resistance to increase the pressure of the solution. Pumping the liquid solution to a high operating pressure typically requires significantly less energy compared to compressing a vapor refrigerant using a compressor. In addition to expending less energy, pumps are typically less costly to install and maintain compared to compressors. This energy and cost savings is a distinct advantage of the present invention over conventional compression-type refrigeration systems.

The solution is also heated, preferably after being pressurized. Heating is preferably accomplished using a heat exchanger, such as shell-and-tube heat exchangers and plate heat exchangers or a distillation column. In a preferred embodiment, heating the solution involves a waste-heat recovery unit (WHRU) (i.e., a heat exchanger that recovers heat from a hot gas or liquid stream, such an exhaust gas from a gas turbine, heat generated in a solar collector or waste gas from a power plant or refinery). The WHRU working medium is preferably water—either pure or with triethylene glycol (TEG), thermal oil or other mediums conducive to heat transfer. In other embodiments, heating the solution involves the use of geothermal, solar derived heat or direct heating from combustion of a fuel such a propane.

After the solution is heated and pressurized, it is subjected to a thermodynamic separation process to produce a vapor refrigerant fraction and a liquid solvent fraction. Examples of such thermodynamic separation processes include column distillation and flashing. Since the two fractions are in different phases, they can be separated easily.

Preferably, the liquid solvent phase is recirculated back to the mixer, while the vapor phase comprising the refrigerant is transferred to a condenser where at least a portion, and preferably substantially all, of the refrigerant is converted from its vapor phase to a liquid phase.

The types of condenser useful in the invention are not particularly limited provided that they are suitable for condensing a hydrofluoroolefin or hydrochlorofluoroolefin refrigerant. Examples of condensers include horizontal or vertical in-shell condensers and horizontal or vertical in-tube condensers.

The liquid phase refrigerant is preferably passed through an expansion valve to lower the pressure of the refrigerant and, correspondingly, cool the refrigerant. The cooled, throttled refrigerant can be in a liquid-phase, vapor-phase, or a mixed-phase.

The refrigerant is then passed through an evaporator wherein the cooling capacity of the refrigerant during evaporation is used to extract heat (i.e., refrigerate) the system to be cooled. Preferably, the material to be cooled in the system is water, with or without a heat transfer additive such as PEG, which can be used, for example, chilled water circulated to air handlers in a distribution system for air conditioning. However, the material to be cooled can also be air used directly for air conditioning. In addition, the external material can also be any flowable material that needs to be cooled, and if water or air, the cooled materials can be used for purposes other than air conditioning (e.g., chilling food or other products).

The type of evaporator used to evaporate the liquid-phase refrigerant is not particularly limited provided that it is suitable for evaporating a hydrofluoroolefin or hydrochlorofluoroolefin refrigerant. Examples of useful evaporators include forced circulation evaporators, natural circulation evaporator, long-tube and short-tube vertical evaporators, falling film evaporators, horizontal tube evaporators, and plate evaporators.

After the refrigerant is evaporated it becomes a low-pressure vapor-phase refrigerant preferably having a temperature of about 30° C. to about 60° C., more preferably about 40° C. to about 50° C. The low-pressure vapor-phase refrigerant is preferably recirculated back to the mixer.

The processes of the present invention are preferably a closed-loop system wherein both the refrigerant and solvent are recirculated. Absorption refrigeration systems according to this invention preferably involve a single, double, or triple effect absorption refrigeration process. Single and double effect processes are described in the Examples and figures described below.

EXAMPLES

Example 1

The solubility of trans-1,3,3,3-tetrafluoropropene (1234ze (E)) in Ford Motor craft oil (a PAG refrigerant compressor oil meeting Ford specification No. WSH-M1C231-B) was measured by means of a micro-balance. The solubility that was measured along with the correlation of the data using the Non-Random Two Liquid ("NRTL") activity coefficient model (Renon H., Prausnitz J. M., "Local Compositions in Thermodynamic Excess Functions for Liquid Mixtures," AIChE J., 14(1), S. 135-144, 1968)) is shown in FIG. 1. From these data it is seen that the Ford Motor Craft oil has nearly negligible vapor pressure and that the NRTL model can accurately represent the data.

Example 2

The data from examples 1 was used to develop a single effect absorption cycle. A representative schematic of a single effect absorption system of this invention is illustrated in FIG. 2.

Figure 2:
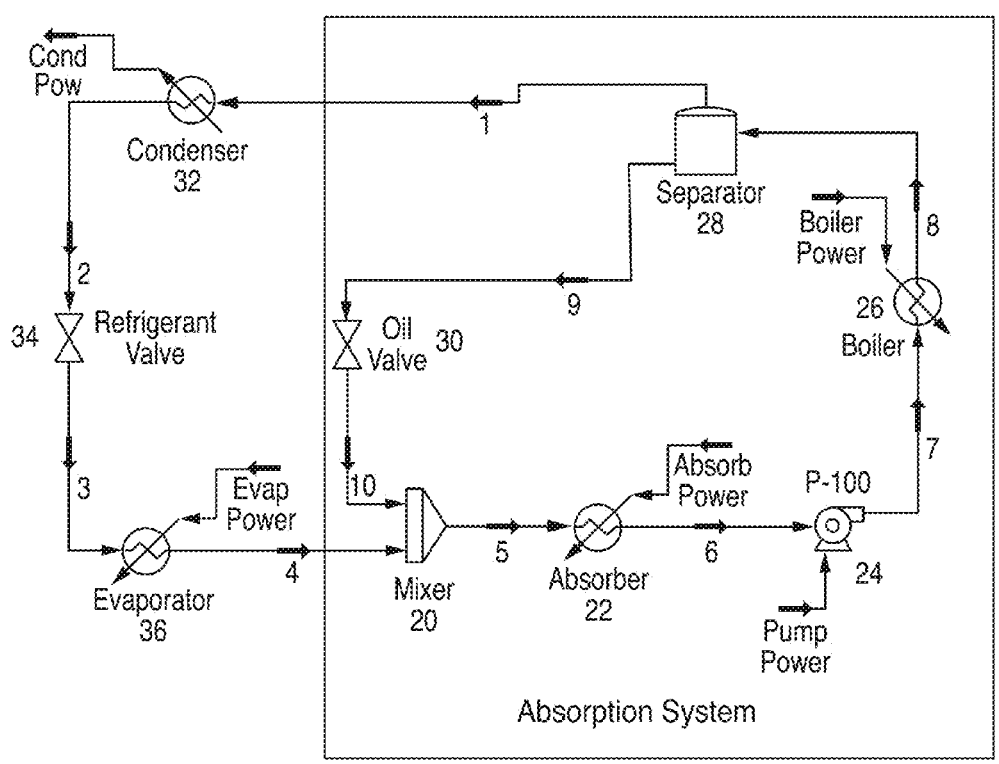
FIG. 2 is a schematic view of an absorption refrigeration cycle according to a preferred embodiment of the invention.

In FIG. 2, a Ford Motorcraft polypropylene glycol dimethyl ether-based oil from line 10 is mixed with a liquid 1234ze(Z) refrigerant from line 4 in a closed mixer 20 (which can be a simple "T" joint connecting lines 4 and 10 to line 5). The mixture in passed though line 5 to an absorber 22 where the gaseous 1234ze(Z) dissolves into the oil. The liquid mixture is passed though line 6 to pump 24 that pressurizes the mixture and passes the mixture through line 7 to heat exchanger/boiler 26. In boiler 26, heat is exchanged with the mixture. The source of that heat can be waste heat from an industrial operation (e.g., power generation) external to the heat exchanger. The temperature of the mixture is raised to a temperature where the 1234ze(Z) refrigerant can separate from the oil. The heated mixture is removed through line 8 from the heat exchanger and introduced to a separator 28 whereby the refrigerant separates substantially in a vapor state from the oil that remains substantially in a liquid state. The oil is then returned through line 9 and through an oil valve 30 where its pressure is decreased to match the pressure in line 4. From valve 30 the oil is returned via line 10 to mixer 20 where it is again mixed with the refrigerant to repeat the process.

From separator 28, the refrigerant vapor is passed through line 1 to a condenser 32 so as to liquefy it. The liquid is passed through line 2 through an expansion valve 34, throttling the liquid refrigerant to cool the refrigerant. The cooled, throttled refrigerant can be liquid, vapor or a combination depending on the operator's choice. The cooled refrigerant is passed through an evaporator 36 whereby the cooling ability of the refrigerant is utilized to cool a material (water or air) that is in a heat-exchanging relationship with evaporator 36. The refrigerant is then returned from evaporator 36 through line 4 to mixer 20 where it is again mixed with the oil to repeat the process again.

The input parameters for the single effect absorption cycle of FIG. 2 are:
1) Evaporator 28: 2° C.
2) Condenser 32: 40° C.
3) 3000 kJ/hr supplied to boiler 26
4) Saturated liquid leaving absorber 22
5) Superheat leaving the evaporator 36 through line 4: 3° C.
6) The composition of stream 8 is 90 wt % oil and 10 wt % refrigerant.

With these parameters, the calculated coefficient of performance ("COP") using 1234ze(Z) and the Ford motor craft oil is 4.56.

Example 3

Figure 3:
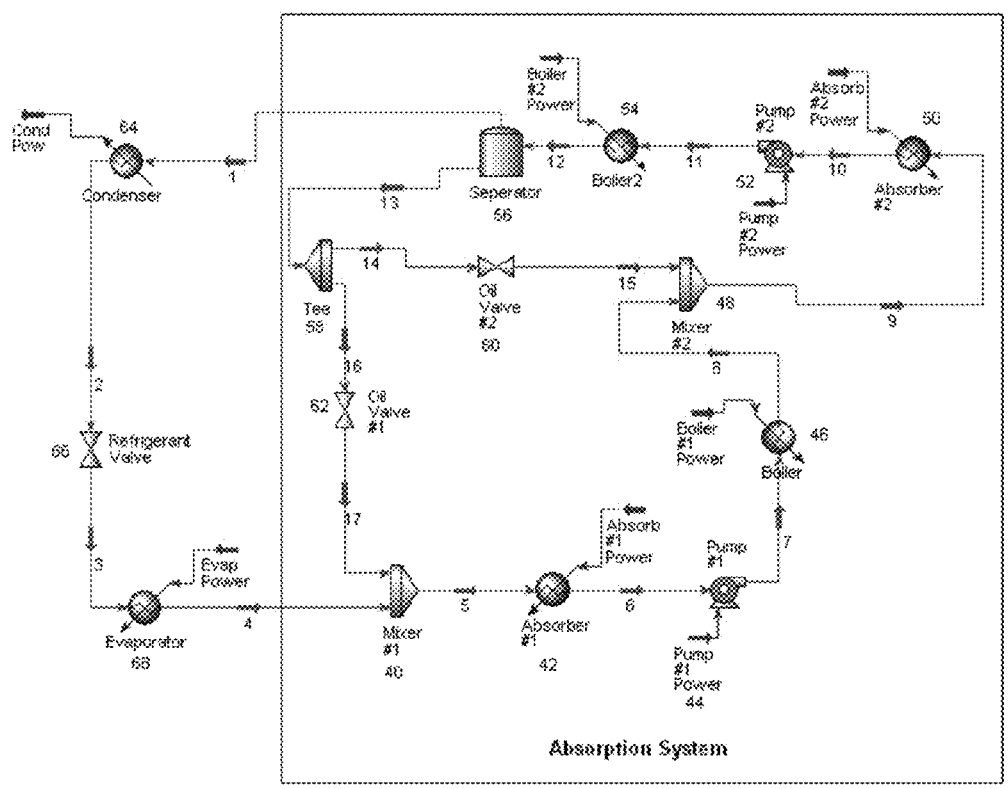
FIG. 3 is a schematic view of another absorption refrigeration cycle according to another preferred embodiment of the invention.

A representative schematic of a double effect absorption is illustrated in FIG. 3.

In FIG. 3, a Ford Motorcraft polypropylene glycol dimethyl ether-based oil from line 17 is mixed with a liquid 1234ze(Z) refrigerant from line 4 in a closed mixer 40. The mixture is passed though line 5 to a first absorber 42 where the gaseous 1234ze(Z) dissolves into the oil. The mixture is passed though line 6 to first pump 44 that pressurizes the mixture and passes the mixture through line 7 to first heat exchanger/boiler 46. In boiler 46, heat is exchanged with the mixture. The source of that heat can be waste heat from an industrial operation (e.g., power generation) external to heat exchanger 46. The temperature of the mixture is raised. The heated mixture is removed through line 8 from heat exchanger 46 and introduced to a second mixer 48 where it is mixed with oil from line 15. The mixture from mixer 48 is taken through line 9 and introduced to second absorber 50 to ensure that all of the 1234ze(Z) is dissolved in the oil. From second absorber 50, the mixture is drawn through line 10 to a second pump 52 that pumps the mixture to a second boiler 54 where the temperature of the mixture is raised to a temperature where the 1234ze(Z) refrigerant can separate from the oil. A source of heat to boiler 54 is provided to accomplish this, which source can be of the type described above.

The mixture is taken from second boiler 54 through line 12 to separator 56 whereby the refrigerant separates substantially in a vapor state from the oil that remains substantially in a liquid state. The oil is then returned through line 13 to tee 58 where it is split between line 14 and 16. Line 14 sends oil through a second oil valve 60 and through line 15 to second mixer 48. Line 16 sends oil through a first oil valve 62 where the pressure is decreased to match the pressure in line 4. The oil then passes through line 17 to mixer 40 where it is again mixed with the refrigerant to repeat the process.

From separator 56, the refrigerant vapor is passed through line 1 to a condenser 64 so as to liquefy it. The liquid is passed through line 2 through an expansion valve 66, throttling the liquid refrigerant to cool the refrigerant. The cooled, throttled refrigerant can be liquid, vapor or a combination depending on the operator's choice. The cooled refrigerant is passed through an evaporator 68 whereby the cooling ability of the refrigerant is utilized to cool a material (water or air) external of evaporator 68. The refrigerant is then returned from evaporator 68 through line 4 to mixer 40 where it is again mixed with the oil to repeat the process again.

The input parameters for the double effect absorption cycle of FIG. 3 are:

1) Evaporator 68: 2° C.
2) Condenser 64 40° C.
3) Pressure exiting Pump 44 is $\exp(\ln(\sqrt{P_{evap} - P_{cond}}))$
4) 1500 kJ/hr supplied to boiler 46
5) Saturated liquid leaving both Absorber 42 and Absorber 50
6) Superheat leaving the evaporator 68: 3° C.
7) Tee 58 splits the flow 30% to stream 14 and 70% to stream 16.
8) The composition of stream 12 is 90 wt % oil and 10 wt % refrigerant.

With these parameters the calculated COP using 1234ze(Z) and Ford motor craft oil is 5.04.

One skilled in the art will recognize that there are other variations of the absorption refrigeration systems disclosed above that can be practiced. For example, Perry's Chemical Engineers' Handbook; Green. D. W.; Perry, R. H.; McGraw-Hill (2008) pg 11-90-11-93 discloses other variations of absorptive refrigeration cycles using liquids different than we use, but many of those variations otherwise can be employed in the practice of this invention.

In addition, various additives can be added to the refrigerant system of this invention. For example, to avoid polymerization of the olefin refrigerant during service, stabilizers may be added. Such stabilizers are known, for example, and include terpenes, epoxides and the like. Other optional additives to add to the refrigerant include 1. antioxidants e.g., phenol based such as BHT
2. extreme pressure additives—chlorinated materials, phosphorous based materials—tricresyl phosphate, sulfur based materials
3. antifoam additives (e.g., silicones)
4. oiliness additives (e.g., organic acids and esters)
5. acid catchers (e.g., epoxides)

What is claimed is:

1. A method for providing absorption refrigeration, comprising:
    a. evaporating in an evaporator a first liquid-phase refrigerant comprising a refrigerant comprising at least one of 1,3,3,3-tetrafluoropropene and 1-chloro-3,3,3-trifluoropropene to produce a low-pressure vapor-phase refrigerant stream, wherein said evaporating transfers heat from a system to be cooled;
    b. contacting in an absorber said low-pressure vapor-phase refrigerant stream with a first low-pressure liquid-phase solvent under conditions effective to dissolve all of said low-pressure vapor phase refrigerant stream in said first low-pressure solvent to produce a low pressure liquid-phase refrigerant-solvent solution, wherein the first solvent stream comprises a polyalkylene glycol oil and/or a polyester oil and wherein said low-pressure refrigerant stream is introduced at a concentration not greater than the saturation point of said low-pressure solvent stream;
    c. increasing the pressure and temperature of said low pressure liquid-phase refrigerant-solvent solution to produce a high pressure liquid-phase refrigerant-solvent solution stream;
    d. thermodynamically separating said high pressure liquid-phase refrigerant-solvent solution stream into a high-pressure vapor-phase refrigerant stream and a second liquid-phase solvent stream;
    e. reducing the pressure of at least a portion of said second liquid-phase solvent stream and using said reduced pressure second liquid-phase solvent to produce said first liquid-phase solvent for step (b);
    f. condensing said high-pressure vapor-phase refrigerant stream to produce a second liquid phase refrigerant stream; and
    g. reducing the pressure of at least a portion of said second liquid-phase refrigerant stream and using said reduced pressure second liquid-phase solvent stream to produce said first liquid-phase refrigerant stream for step (a).

2. The method of claim 1 wherein said increasing the temperature of said solution in step (c) involves the transfer of heat from a source of industrial waste heat to said solution.

3. The method of claim 1 wherein said increasing the temperature of said solution in step (c) involves the transfer of geothermal heat to said solution.

4. The method of claim 1 wherein said increasing the temperature of said solution in step (c) involves the transfer of solar heat to said solution.

5. The method of claim 1, wherein when the refrigerant comprises 1,3,3,3-tetrafluoropropene the first solvent stream comprises polypropylene glycol dimethyl ether.

6. An absorption refrigeration system comprising:
    a. a refrigerant comprising 1,3,3,3-tetrafluoropropene;

b. a solvent comprising a polyalkylene glycol oil and/or a polyolester;
c. an evaporator suitable for evaporating said refrigerant;
d. a mixer suitable for mixing said refrigerant with said solvent, wherein said mixer is fluidly connected to said evaporator;
e. an absorber suitable for dissolving at least a portion of said refrigerant into said solvent to produce a solution, wherein said absorber is fluidly connect to said mixer;
f. a pump fluidly connected to said absorber;
g. a heat exchanger fluidly connected to said pump;
h. a separator suitable for thermodynamically separating said solution into a vapor refrigerant component and a liquid solvent component, wherein said separator is fluidly connected to said heat exchanger;
i. an oil return line fluidly connected to said separator and said mixer, and
j. a condenser suitable for condensing said vapor refrigerant component, wherein said condenser is fluidly connected to said separator and said evaporator.

7. The system of claim 6 wherein said separator is a distillation column or a flashing separator.

8. The system of claim 6, wherein when the refrigerant comprises 1,3,3,3-tetrafluoropropene the first solvent stream comprises polypropylene glycol dimethyl ether.

9. An absorption refrigeration system comprising:
a. a refrigerant comprising 1,3,3,3-tetrafluoropropene;
b. a solvent comprising a polyalkylene glycol oil and/or a polyolester;
c. an evaporator suitable for evaporating said refrigerant;
d. a condenser suitable for condensing said refrigerant;
e. a separator suitable for thermodynamically separating a solution comprising said refrigerant dissolved in said solvent into a vapor refrigerant component and a liquid solvent component; and
f. at least one gas-dissolving subsystem comprising a mixer suitable for mixing said refrigerant with said solvent, an absorber suitable for dissolving at least a portion of said refrigerant into said solvent to produce a solution, a pump, and a heat exchanger, wherein said mixer is fluidly connected to said absorber, said absorber is fluidly connected to said pump, and said pump is fluidly connected to said heat exchanger; wherein said gas-dissolving subsystem is in fluid communication with said at least two units selected from the group consisting of said evaporator, said separator, and another gas-dissolving subsystem, provided that at least one subsystem is in fluid communication with said evaporator and at least one subsystem is in fluid communication with said separator.

10. The system of claim 9 wherein said separator is a distillation column or a flashing separator.

11. The system of claim 9 wherein said system comprises two gas-dissolving subsystems.

12. The system of claim 9, wherein when the refrigerant comprises 1,3,3,3-tetrafluoropropene the first solvent stream comprises polypropylene glycol dimethyl ether.

* * * * *